United States Patent
Tomida

(10) Patent No.: US 12,262,292 B2
(45) Date of Patent: Mar. 25, 2025

(54) NON-TRANSITORY COMPUTER READABLE MEDIUM AND INFORMATION PROCESSING SYSTEM

(71) Applicant: FUJIFILM BUSINESS INNOVATION CORP., Tokyo (JP)

(72) Inventor: Munenori Tomida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 832 days.

(21) Appl. No.: 17/366,765

(22) Filed: Jul. 2, 2021

(65) Prior Publication Data
US 2022/0295248 A1    Sep. 15, 2022

(30) Foreign Application Priority Data
Mar. 9, 2021  (JP) .................................. 2021-037592

(51) Int. Cl.
| | |
|---|---|
| H04L 67/00 | (2022.01) |
| G06F 3/12 | (2006.01) |
| G06F 21/10 | (2013.01) |
| H04W 4/029 | (2018.01) |
| H04W 4/50 | (2018.01) |
| H04W 8/22 | (2009.01) |

(52) U.S. Cl.
CPC .............. *H04W 4/50* (2018.02); *G06F 21/10* (2013.01); *H04L 67/34* (2013.01); *H04W 4/029* (2018.02); *H04W 8/22* (2013.01)

(58) Field of Classification Search
CPC ......... H04W 4/50; H04W 4/029; H04W 8/22; H04W 4/02; G06F 21/10; G06F 3/1204; G06F 3/1232; G06F 3/1236; G06F 3/1292; G06F 8/61; H04L 67/34; H04L 67/51; H04N 1/0048; H04N 2201/0082; H04N 1/00307; H04N 1/00233; H04N 1/32117; H04N 1/32765
See application file for complete search history.

(56) References Cited

U.S. PATENT DOCUMENTS

| | | | | |
|---|---|---|---|---|
| 2013/0246923 | A1* | 9/2013 | Iwai | ......................... H04L 67/10 715/736 |
| 2013/0247117 | A1* | 9/2013 | Yamada | .................... H04B 5/72 340/12.5 |
| 2017/0070951 | A1* | 3/2017 | Takeuchi | ............... H04W 48/20 |
| 2017/0220304 | A1* | 8/2017 | Ando | ..................... G06F 3/1203 |
| 2020/0053244 | A1* | 2/2020 | Yamada | ................ G06F 3/1231 |

FOREIGN PATENT DOCUMENTS

JP        2017-151781 A    8/2017

* cited by examiner

*Primary Examiner* — Joseph E Dean, Jr.
(74) *Attorney, Agent, or Firm* — Oliff PLC

(57) ABSTRACT

A non-transitory computer readable medium stores a program that causes a computer to execute information processing. The information processing includes: receiving, through a wireless line, model information indicating a model of a service apparatus configured to provide a service in cooperation with a mobile terminal; and execute a process of activating an execution function associated with the model of the service apparatus indicated by the model information from among plural execution functions included in the mobile terminal, the plural execution functions being execution functions of executing services each associated in advance with a respective one of models of service apparatuses.

20 Claims, 13 Drawing Sheets

| SHOP NUMBER | MODEL INFORMATION |
|---|---|
| 1 | 5 |

FIG. 11

| POSITION INFORMATION | SHOP NUMBER | MODEL INFORMATION |
|---|---|---|
| 35.536999, 139.635285 | 1 | 5 |
| 35.537146, 139.631614 | 2 | 4 |
| 35.536228, 139.625178 | 3 | 5 |
| 35.540029, 139.628637 | 4 | 4 |

| SPOT ID | SHOP NUMBER | MODEL INFORMATION |
|---|---|---|
| 0001 | 1 | 5 |
| 0002 | 2 | 4 |
| 0003 | 3 | 5 |
| 0004 | 4 | 4 |

~44A

NON-TRANSITORY COMPUTER READABLE MEDIUM AND INFORMATION PROCESSING SYSTEM

CROSS-REFERENCE TO RELATED APPLICATIONS

This application is based on and claims priority under 35 USC 119 from Japanese Patent Application No. 2021-037592 filed Mar. 9, 2021.

BACKGROUND

(i) Technical Field

The present disclosure relates to a non-transitory computer readable medium and an information processing system.

(ii) Related Art

JP-A-2017-151781 discloses an advertisement provision system for providing advertisement information to a mobile terminal. The advertisement provision system includes a beacon platform configured to provide the advertisement information to the mobile terminal based on a content of a beacon signal received by the mobile terminal from a device installed in an ATM. The beacon platform includes a beacon registry, a campaign registry, and a campaign matching unit. Location information on the ATM configured to transmit the beacon signal is registered in the beacon registry. Information for specifying the advertisement information and information on a distribution condition are registered in the campaign registry for each piece of the advertisement information. The campaign matching unit is configured to acquire beacon identification information related to the beacon signal and attribute information related to a user from the mobile terminal that receives the beacon signal via a network, acquire the location information on the ATM corresponding to the acquired beacon identification information from the beacon registry, and acquire the advertisement information to be provided to the mobile terminal from the campaign registry based on context information including the acquired location information and the acquired attribute information related to the user.

SUMMARY

A service apparatus that provides a specific service in cooperation with a mobile terminal owned by a user may be installed.

To receive the service from such a service apparatus, the user activates an application for using the service apparatus on the mobile terminal, and uses the service of the service apparatus through the application on the mobile terminal.

Meanwhile, service apparatuses have been continuously improving in hardware and software to provide new services to the user, and new succeeding models are developed.

When a service provision company that provides a service using a service apparatus is ready for a succeeding model, all service apparatuses of a previous model installed in the market may be replaced with the succeeding model. In practice, however, for reasons of cost effectiveness and the like, the previous model may be replaced with the succeeding model little by little over time. Therefore, service apparatuses of different models may be installed in the market at the same time.

When the models are different, contents of services provided by the service apparatuses may be different. Therefore, the user may need to use an application compatible with a model of a service apparatus that he or she is about to use, on the mobile terminal. However, requesting the user to check the model of the service apparatus may reduce convenience for the user.

Aspects of non-limiting embodiments of the present disclosure relate to a non-transitory computer readable medium and an information processing system capable of providing a user with a service corresponding to a model of a service apparatus even when the user is not aware of the model of the service apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a non-transitory computer readable medium storing a program that causes a computer to execute information processing. The information processing includes: receiving, through a wireless line, model information indicating a model of a service apparatus configured to provide a service in cooperation with a mobile terminal; and execute a process of activating an execution function associated with the model of the service apparatus indicated by the model information from among plural execution functions included in the mobile terminal, the plural execution functions being execution functions of executing services each associated in advance with a respective one of models of service apparatuses.

BRIEF DESCRIPTION OF THE DRAWINGS

Exemplary embodiment(s) of the present disclosure will be described in detail based on the following figures, wherein:

FIG. 11 shows an example of a shop information table;

FIG. 15 shows an example of a shop information table used by a management server according to the fifth exemplary embodiment.

DETAILED DESCRIPTION

Figure 1:
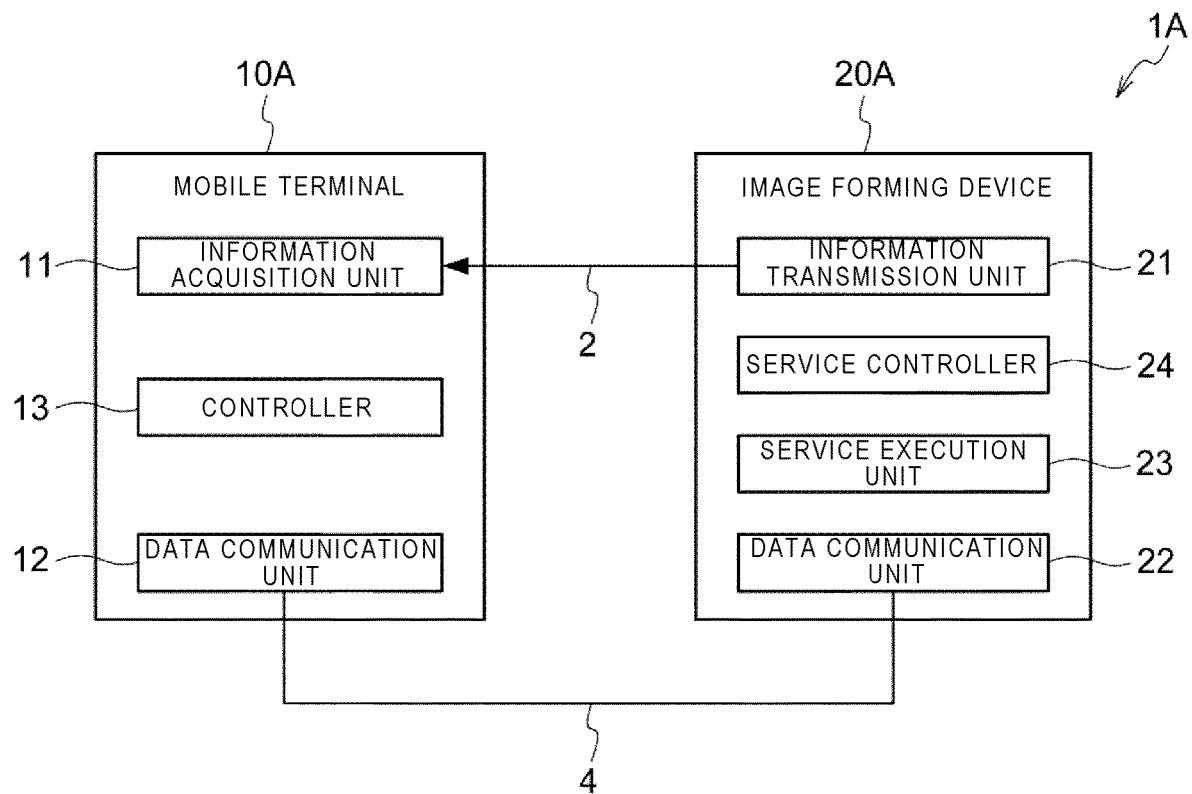
FIG. 1 shows a configuration example of an information processing system according to a first exemplary embodiment.

Hereinafter, exemplary embodiments will be described with reference to the accompanying drawings. The same elements and the same process are denoted by the same reference numerals throughout the drawings, and redundant description thereof will be omitted.

There is no restriction on a type of a service apparatus as long as the service apparatus provides a service to a user in cooperation with a mobile terminal. In the following exemplary embodiments, an image forming device that prints a photograph on a recording medium will be described as an example of the service apparatus. There is no restriction on an installation location of the image forming device. The image forming device may be installed in, for example, a workplace or a public facility. In the following exemplary embodiments, an example in which the image forming device is installed in a shop such as a convenience store will be described.

First Exemplary Embodiment

FIG. 1 shows a configuration example of an information processing system 1A according to a first exemplary embodiment. The information processing system 1A includes a mobile terminal 10A and an image forming device 20A. The information processing system 1A uses the mobile terminal 10A owned by a user as a user interface of a service provided by the image forming device 20A.

That is, the user notifies the image forming device 20A of, for example, (i) connection with the image forming device 20A, (ii) transmission of data of a photograph to be printed, (iii) print settings such as designation of a photograph size and selection of image processing, and (iv) an instruction to print the photograph, through various screens for operating the image forming device 20A displayed on the mobile terminal 10A.

The mobile terminal 10A includes functional units, that is, an information acquisition unit 11, a data communication unit 12, and a controller 13.

The information acquisition unit 11 acquires model information on the image forming device 20A through a wireless line 2. The image forming device 20A is installed in a shop that the user has entered. Here, the wireless line 2 is a line through which data is transmitted and received using short range wireless communication. The short range wireless communication is a wireless communication mode in which data communication is performed within a range in which a communication partner can be seen from a position of each of apparatuses (in this case, the mobile terminal 10A and the image forming device 20A) that transmit and receive data. The short range wireless communication is, for example, a wireless communication mode in which a maximum communication distance is limited within the shop in which the image forming device 20A is installed. In the wireless line 2, the data communication using the short range wireless communication such as a beacon, Bluetooth (registered trademark), and ZigBee (registered trademark) is performed. Here, for example, the data communication using the beacon is performed in the wireless line 2.

The model information on the image forming device 20A is information indicating a model of the image forming device 20A, and is, for example, a model number of the image forming device 20A. However, even when the image forming device 20A has the same model number, the image forming device 20A may be treated as a different model when a program of the image forming device 20A is upgraded. Therefore, the model information on the image forming device 20A may include a version indicating a difference in the program of the image forming device 20A in addition to the model number indicating a difference in the hardware of the image forming device 20A.

The data communication unit 12 performs the data communication with the image forming device 20A through a wireless line 4 connected to a data communication unit 22 of the image forming device 20A. The data communication unit 22 will be described later. Specifically, the data communication unit 12 transmits data of the photograph to be printed by the image forming device 20A to the image forming device 20A.

Here, the wireless line 4 is an example of a line through which the data is transmitted and received using a wireless local area network (LAN). The wireless line 4 is a line through which apparatuses perform peer-to-peer (also referred to as "P2P") data communication without a wireless router. For example, Wi-Fi Direct (registered trademark) and wireless LAN communication using an ad hoc mode are used for the wireless line 4. Here, for example, data communication using Wi-Fi Direct (registered trademark) is performed in the wireless line 4.

The controller 13 controls the information acquisition unit 11 and the data communication unit 12 to execute execution functions of executing services each associated in advance with a respective one of models of the image forming devices 20A.

The execution function of executing the service in the mobile terminal 10A is a function of executing a service (in this case, printing a photograph) provided by the image forming device 20A in cooperation with the image forming device 20A. For convenience of description, the execution function of executing the service will be simply referred to as an "execution function".

The execution function in the mobile terminal 10A is provided in a form of, for example, an application from a manufacturer of the image forming device 20A. An application in the mobile terminal 10A is a program that allows the user to select whether to install the application in the mobile terminal 10A and that allows the user to select whether to delete the application from the mobile terminal 10A.

Contents of services provided by image forming devices 20A of different models and data formats provided by the image forming devices 20A of the different models may be different from each other. Therefore, the manufacturer of the image forming device 20A updates the version of the application for the mobile terminal 10A in accordance with development of a new image forming device 20A, and provides, for example, the user with an application including an execution function compatible with both the existing model and the new model.

Among plural execution functions included in the mobile terminal 10A in advance, the controller 13 activates an execution function associated with the model of the image forming device 20A indicated by the model information.

Meanwhile, the image forming device 20A includes functional units, that is, an information transmission unit 21, the data communication unit 22, a service execution unit 23, and a service controller 24.

The information transmission unit 21 constantly transmits the model information on the image forming device 20A through the wireless line 2. The phrase "constantly transmit the model information on the image forming device 20A" means to repeatedly transmit the model information at a predetermined interval. The transmission interval of the model information is set to, for example, an interval at which the mobile terminal 10A can receive the model information at least once during a period in which the user is in the shop where the image forming device 20A is installed.

The data communication unit 22 performs the data communication with the data communication unit 12 of the mobile terminal 10A through the wireless line 4. Specifically, the data communication unit 22 receives, for example, the data of the photograph to be printed by the image forming device 20A from the mobile terminal 10A.

The service execution unit 23 executes the service provided by the image forming device 20A, that is, a photograph print service. Specifically, the service execution unit 23 prints the photograph data, which has been transmitted from the mobile terminal 10A to the data communication unit 22 of the image forming device 20A, on a recording medium in accordance with a print setting designated by the application of the mobile terminal 10A.

The service controller 24 controls the information transmission unit 21, the data communication unit 22, and the service execution unit 23 to transmit the model information and print the photograph.

Figure 2:
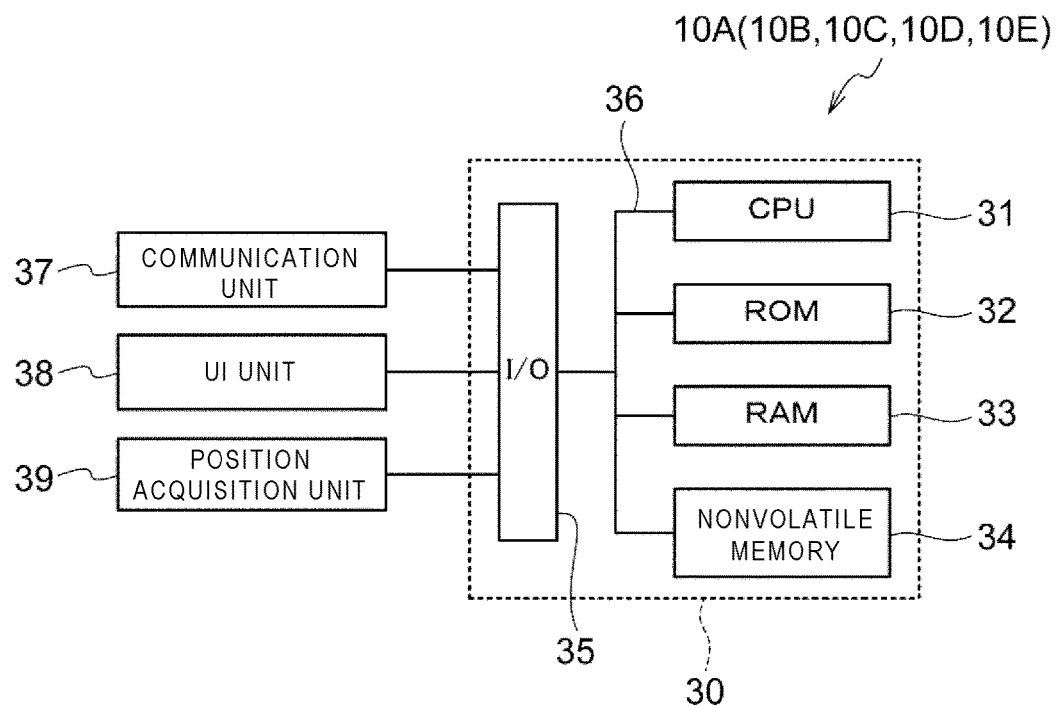
FIG. 2 shows a configuration example of a mobile terminal including a computer.

The mobile terminal 10A shown in FIG. 1 is implemented by, for example, a computer 30. FIG. 2 shows a configuration example of the mobile terminal 10A.

The computer 30 includes a central processing unit (CPU) 31 (an example of a processor) that implements the functional units of the mobile terminal 10A shown in FIG. 1, a read only memory (ROM) 32 that stores an information processing program that causes the computer 30 to function as the mobile terminal 10A, a random access memory (RAM) 33 used as a temporary work area of the CPU 31, a nonvolatile memory 34, and an input and output interface (I/O) 35. The CPU 31, the ROM 32, the RAM 33, the nonvolatile memory 34, and the I/O 35 are connected to each other via a bus 36.

The nonvolatile memory 34 is an example of a storage device that retains information even when power supplied to the nonvolatile memory 34 is cut off. For example, a semiconductor memory is used as the nonvolatile memory 34. Alternatively, a hard disk may be used. The data of the photograph to be printed by the image forming device 20A is stored in the nonvolatile memory 34.

The nonvolatile memory 34 does not necessarily have to be built in the computer 30. Instead, the nonvolatile memory 34 may be a portable storage device that is detachably attached to the computer 30.

For example, a communication unit 37, a user interface (UI) unit 38, and a position acquisition unit 39 are connected to the I/O 35.

The communication unit 37 is connected to the wireless line 2 and the wireless line 4. The communication unit 37 complies with communication protocols to perform the data communication through the wireless line 2 and the wireless line 4.

The UI unit 38 provides an interface between the mobile terminal 10A and the user. The UI unit 38 receives an instruction from the user, notifies the CPU 31 of the instruction, and notifies the user of information processed by the CPU 31. The UI unit 38 is, for example, a liquid crystal display or an organic electro-luminescence (EL) display, and a touch panel superimposed on the display.

The position acquisition unit 39 is a unit that acquires position information indicating a position of the mobile terminal 10A. The position acquisition unit 39 is, for example, a global positioning system (GPS) unit.

The units connected to the I/O 35 are not limited to, for example, the communication unit 37, the UI unit 38, and the position acquisition unit 39. It is needless to say that another unit such as an image capturing unit that captures an image (specifically, takes a photograph) may be connected to the I/O 35 as necessary.

Next, the service of the image forming device 20A executed in cooperation with the mobile terminal 10A will be described in detail.

Figure 3:
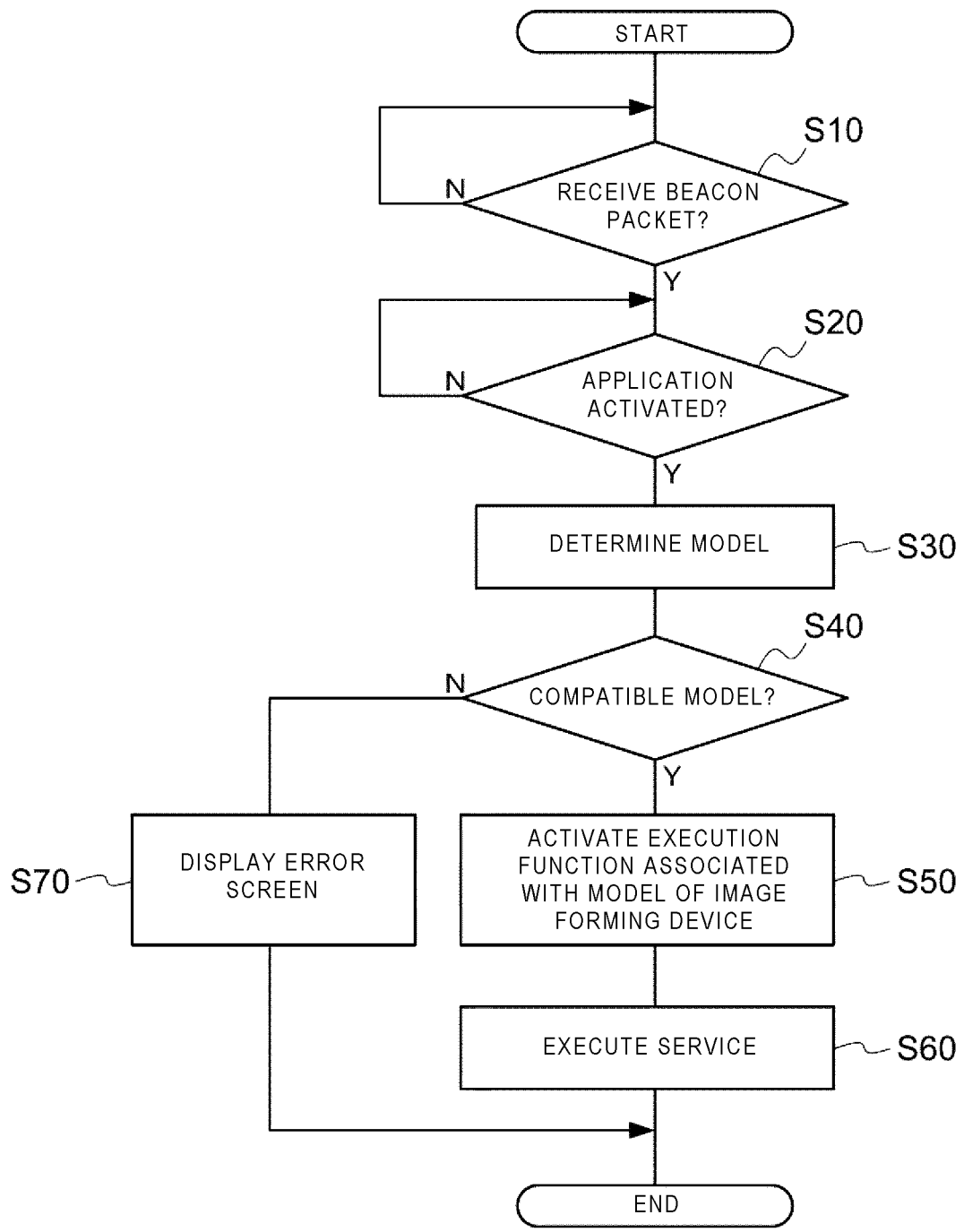
FIG. 3 is a flowchart of an example of a service process in the mobile terminal according to the first exemplary embodiment.

FIG. 3 is a flowchart of an example of a service process executed by the CPU 31 of the mobile terminal 10A, for example, when the mobile terminal 10A is powered on.

An information processing program that defines the service process is stored in advance in, for example, the ROM 32 of the mobile terminal 10A. The CPU 31 of the mobile terminal 10A reads the information processing program stored in the ROM 32 and executes the service process.

First, in step S10, the CPU 31 determines whether a beacon packet 9 indicating the model information on the image forming device 20A has been received.

Figures 4, 5:
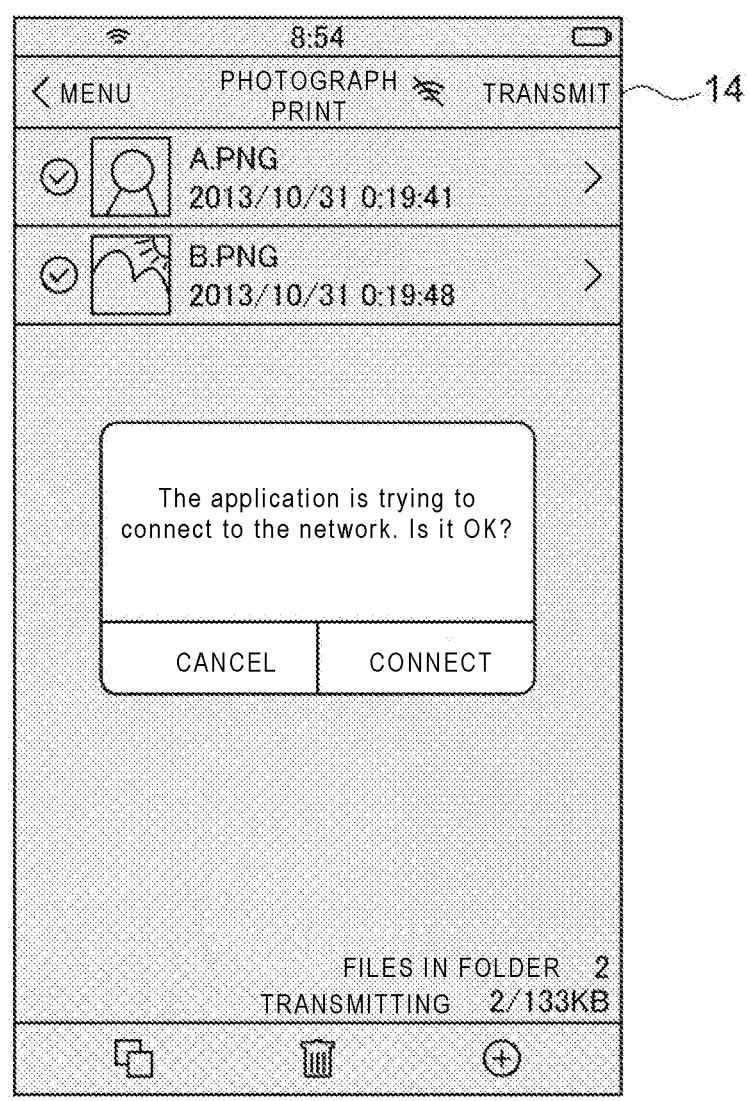
FIG. 4 shows an example of a beacon packet.
FIG. 5 shows an example of a connection screen.

FIG. 4 shows an example of the beacon packet 9. The beacon packet 9 includes, for example, (i) a shop number of the shop in which the image forming device 20A is installed and (ii) the model information on the image forming device 20A installed in the shop. The model information on the image forming device 20A is indicated by a numerical value associated with a model. For example, "4" corresponds to the current model, and "5" corresponds to a new model.

When the beacon packet 9 has not been received, the CPU 31 repeatedly executes the determination process of step S10 of FIG. 3 to monitor a reception status of the beacon packet 9. On the other hand, when the beacon packet 9 has been received, the model information on the image forming device 20A indicated by the beacon packet 9 is stored in the RAM 33, and the process proceeds to step S20.

In step S20, the CPU 31 determines whether the user has activated an application for using the service of the image forming device 20A (hereinafter, simply referred to as an "application"). When the application has not been activated, the CPU 31 repeatedly executes the determination process of step S20 to monitor an activation state of the application. On the other hand, when the application has been activated, the process proceeds to step S30.

As a matter of course, when the beacon packet 9 has not been received and/or when the application has not been activated, the CPU 31 may receive an instruction to execute a process that is not related to the service of the image forming device 20A from the user, for example, another process such as editing of an e-mail from the user, and execute the instructed process.

In step S30, the CPU 31 refers to the RAM 33 and determines the model of the image forming device 20A that the user is about to use (hereinafter, simply referred to as the "image forming apparatus 20A") based on the model information on the image forming device 20A indicated by the beacon packet 9.

In step S40, the CPU 31 determines whether the model of the image forming device 20A determined in step S30 is a model capable of providing the service using the activated application, that is, a model compatible with the application. The activated application includes information on models compatible with the application in advance. Thus, the CPU 31 may compare the information on the compatible models included in the application with the model of the image forming device 20A determined in step S30 to determine whether the model of the image forming device 20A is compatible with the application.

When the model of the image forming device 20A is compatible with the application, the process proceeds to step S50.

In step S50, the CPU 31 activates the execution function associated with the model of the image forming device 20A.

For example, when the execution function is implemented by another application (referred to as a "child application") called from the application whose activation state has been determined in the determination process of step S20, the CPU 31 activates a child application associated with the model of the image forming device 20A from among plural child applications that implement the execution function.

When the execution function is implemented by an individual module included in the application whose activation state has been determined in the determination process of step S20, the CPU 31 selects a module associated with the model of the image forming device 20A from among plural modules that implement the execution function, and executes a process defined by the module.

The module is an execution unit that defines one integrated function (in this case, the execution function for each model of the image forming device 20A). For example, ".lib" or ".dll" is used as an extension of a file that defines the module. The module may not exist independently as one file, but may be incorporated in the application. In this case, plural execution functions corresponding to models of the image forming device 20A are included in one application.

FIG. 5 shows an example of a connection screen 14 displayed on the UI unit 38 of the mobile terminal 10A by the CPU 31 when the mobile terminal 10A includes the child application associated with the model of the image forming device 20A.

Since the mobile terminal 10A has the execution function associated with the model of the image forming device 20A, the CPU 31 displays the connection screen 14 for connecting to the image forming device 20A as shown in FIG. 5. When the user selects "CONNECT", the CPU 31 controls the communication unit 37 to connect to the image forming device 20A through the wireless line 4.

In step S60 of FIG. 3, the CPU 31 transmits data of a photograph selected by the user to the image forming device 20A through the wireless line 4, and causes the image forming device 20A to execute the photograph print service.

When the user selects "CANCEL" on the connection screen 14 shown in FIG. 5, the CPU 31 ends the service process of FIG. 3 without starting the execution of the photograph print service in step S60.

On the other hand, when it is determined in the determination process of step S40 that the model of the image forming device 20A is not compatible with the application, the process proceeds to step S70.

In step S70, the CPU 31 displays an error screen 15 on the UI unit 38 of the mobile terminal 10A in order to notify the user that the service that the user wants to use on the image forming device 20A installed in the shop which he/she entered is unavailable from the mobile terminal 10A owned by the user.

Figure 6:
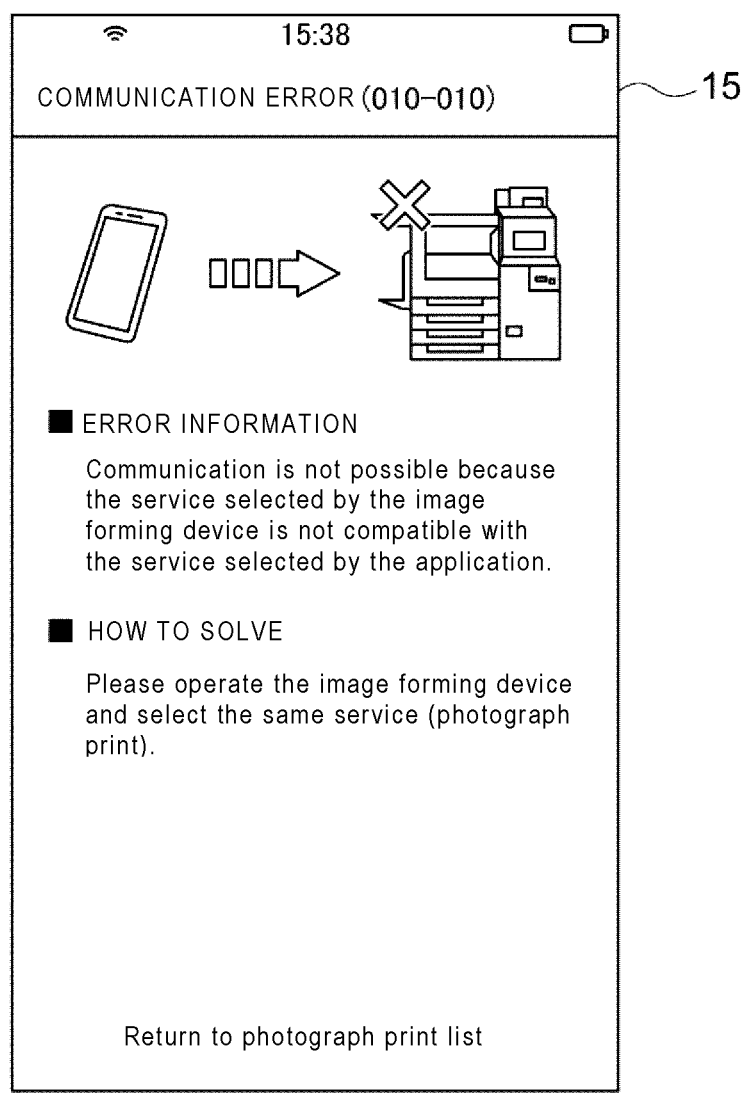
FIG. 6 shows an example of an error screen.

FIG. 6 shows an example of the error screen 15. The error screen 15 displays, for example, a message notifying the user that the model of the image forming device 20A is not compatible with the application.

After displaying the error screen 15 on the UI unit 38 of the mobile terminal 10A, the CPU 31 ends the service process of FIG. 3. When the model of the image forming device 20A is not compatible with the application, the user may perform the photograph print in the following manner. That is, the user may store the photograph data, which is stored in the nonvolatile memory 34 of the mobile terminal 10A, in a memory card, insert the memory card storing the photograph data into a card slot of the image forming device 20A, and directly operate the image forming device 20A.

Further, when the model of the image forming device 20A is not compatible with the application, the CPU 31 may display, on the UI unit 38, a download screen (not shown) for prompting the user to download, on the Internet, the application compatible with the service provided by the model of the image forming device 20A. When the user gives an instruction to download the application compatible with the model of the image forming device 20A from the download screen, the CPU 31 executes the downloaded new application and activates the execution function associated with the model of the image forming device 20A.

Here, for example, an example in which the user activates the application has been described. The user might activates another application that is not related to the service provided by the image forming device 20A, instead of activating the application for using the service of the image forming device 20A. Therefore, in the determination process of step S20, the CPU 31 may determine whether the application activated by the user is a correct application for using the service of the image forming device 20A.

When another application that is not related to the service provided by the image forming device 20A has been activated, the CPU 31 may display the error screen 15 on the UI unit 38 of the mobile terminal 10A. In this case, when the application for using the service of the image forming device 20A has already been installed in the mobile terminal 10A, the CPU 31 may activate the application for using the service of the image forming device 20A. Further, when the application for using the service of the image forming device 20A has not yet been installed in the mobile terminal 10A, the CPU 31 may display the download screen (not shown) on the UI unit 38 to prompt the user to download the application.

In this way, according to the information processing system 1A of the first exemplary embodiment, the mobile terminal 10A receives the beacon packet 9 transmitted by the image forming device 20A, determines the model of the image forming device 20A, and activates the execution function associated with the model of the image forming device 20A.

Second Exemplary Embodiment

A second exemplary embodiment describes an information processing system 1B that gives notice of model information on an image forming device 20B according to a second exemplary embodiment, using a service set identifier (SSID) instead of the beacon packet 9.

The SSID is an identification name for identifying an access point of a wireless LAN. It is assumed that the SSID of the image forming device 20B is determined in advance for each mode. More specifically, the image forming devices 20B of different models have different SSIDs. The image forming device 20B constantly transmits the SSID through the wireless line 4.

Figure 7:
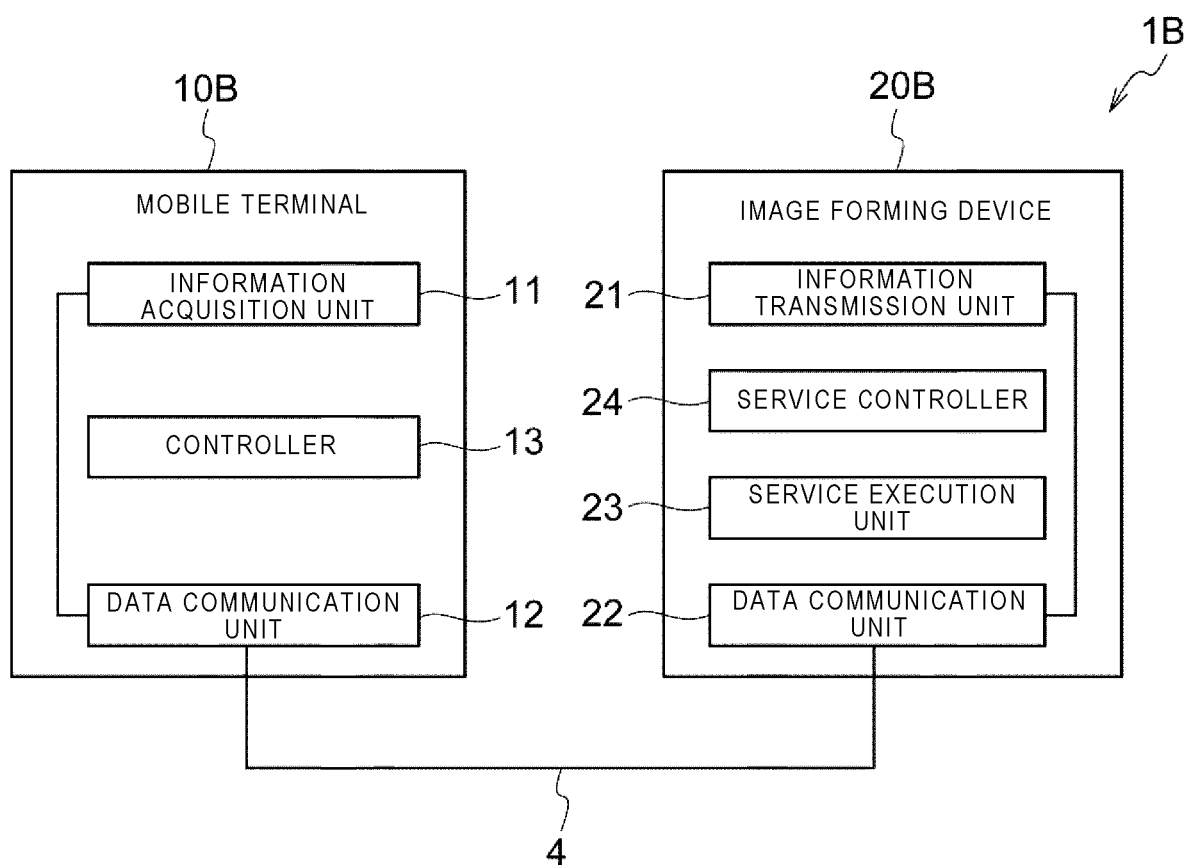
FIG. 7 shows a configuration example of an information processing system according to a second exemplary embodiment.

FIG. 7 shows a configuration example of the information processing system 1B according to the second exemplary embodiment. The information processing system 1B includes a mobile terminal 10B and the image forming device 20B. The image forming device 20B of the information processing system 1B shown in FIG. 7 is different from the image forming device 20A shown in FIG. 1 in that the information transmission unit 21 transmits the model information on the image forming device 20B via the wireless line 4 through the data communication unit 22. Further, the information acquisition unit 11 of the mobile terminal 10B acquires the model information on the image forming device 20B, which is received via the wireless line 4 through the data communication unit 12. The other configurations and functions of the information processing system 1B are the same as those of the information processing system 1A according to the first exemplary embodiment. Further, as in the mobile terminal 10A according to the first exemplary embodiment, the mobile terminal 10B is implemented by the computer 30 shown in FIG. 2.

Hereinafter, when it is not necessary to distinguish between the mobile terminal 10A and the mobile terminal 10B, the mobile terminal 10A and the mobile terminal 10B are referred to as a "mobile terminal 10". Similarly, when it is not necessary to distinguish between the image forming devices of the respective exemplary embodiments, the image forming devices are referred to as an "image forming device 20".

Figure 8:
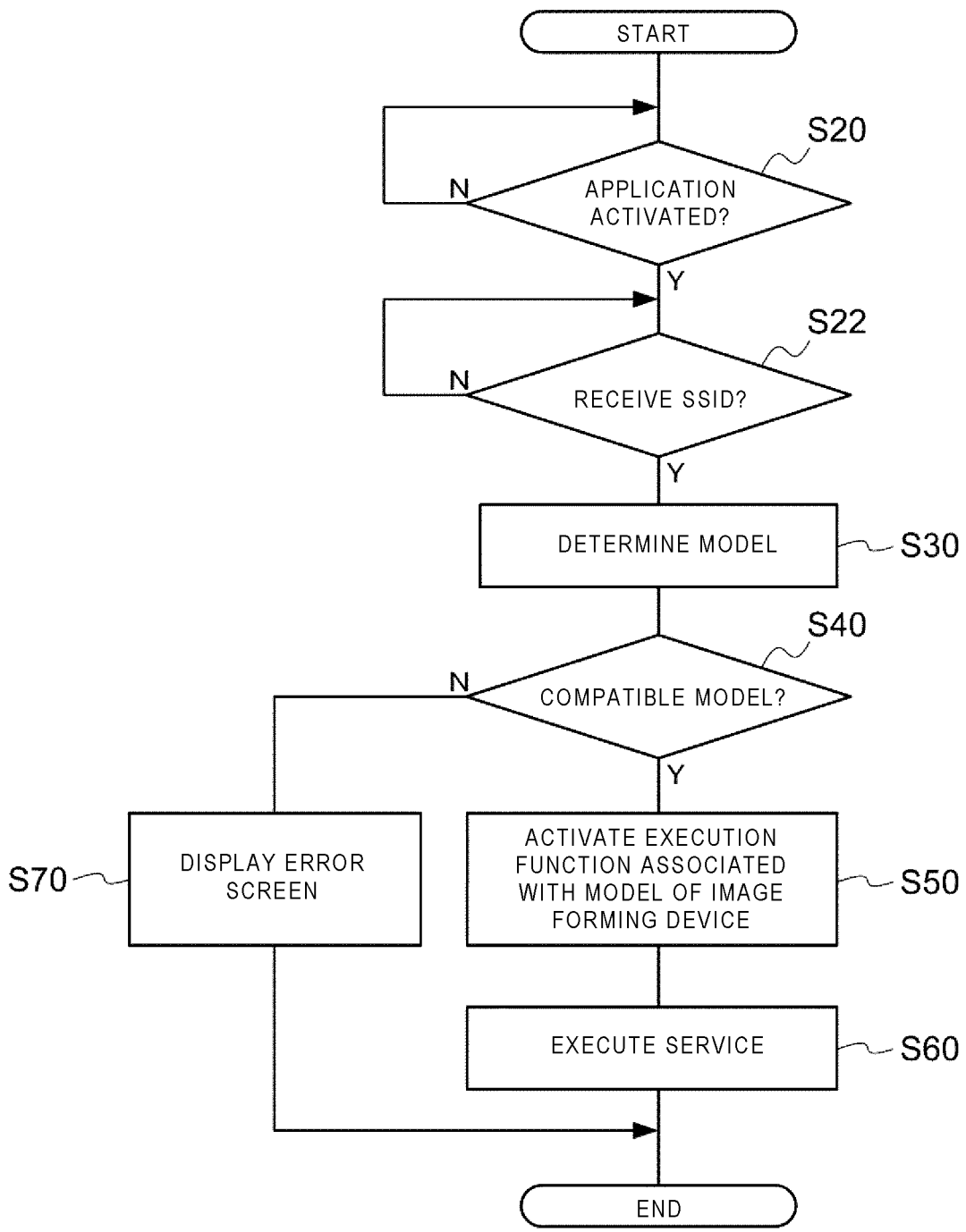
FIG. 8 is a flowchart of an example of a service process in a mobile terminal according to the second exemplary embodiment.

FIG. 8 is a flowchart of an example of a service process executed by the CPU 31 of the mobile terminal 10B.

An information processing program that defines the service process is stored in advance in, for example, the ROM 32 of the mobile terminal 10B. The CPU 31 of the mobile terminal 10B reads the information processing program stored in the ROM 32 and executes the service process.

In the service process of the mobile terminal 10A according to the first exemplary embodiment shown in FIG. 3, the image forming device 20A transmits the model information using a beacon, whereas the image forming device 20B transmits the model information using the wireless LAN. Therefore, first, in step S20, the CPU 31 determines whether a user has activated an application. When the application has not been activated, the CPU 31 repeatedly executes the determination process of step S20 to monitor an activation state of the application. On the other hand, when the application has been activated, the process proceeds to step S22.

In step S22, the CPU 31 determines whether the SSID has been received from the image forming device 20B via the wireless line 4. When the SSID has not been received, the CPU 31 repeatedly executes the determination process of step S22 to monitor a reception status of the SSID. On the other hand, when the SSID has been received, the process proceeds to step S30.

Different SSID are associated with respective models of the image forming devices 20B. For example, a "network 4" is associated with a current model, and a "network 5" is associated with a new model. Therefore, in step S30, the CPU 31 determines the model of the image forming device 20B based on the received SSID.

Thereafter, the CPU 31 executes the same process as the process of step S40 and subsequent steps of the mobile terminal 10A according to the first exemplary embodiment shown in FIG. 3, and activates an execution function associated with the model of the image forming device 20B. The CPU 31 connects to an access point represented by the received SSID and establishes the wireless line 4 with the image forming device 20B.

The CPU 31 may determine whether the activated application is an application for the user to use a service of the image forming device 20B based on a correspondence between the SSID set in advance and the application, and may display the error screen 15 on the UI unit 38 of the mobile terminal 10B when another application that is not related to the service provided by the image forming device 20B has been activated. In this case, when the application for using the service of the image forming device 20B has not yet been installed in the mobile terminal 10B, the CPU 31 may display a download screen (not shown) on the UI unit 38 to prompt the user to download the application.

In this way, the SSID for identifying the access point of the wireless LAN is used as the model information indicating the model of the image forming device 20B, so that the execution function associated with the model of the image forming device 20B can be activated in the mobile terminal 10B.

Third Exemplary Embodiment

A third exemplary embodiment describes an information processing system 1C that receives model information on an image forming device 20 from an external device that is different from the image forming device 20.

Figure 9:
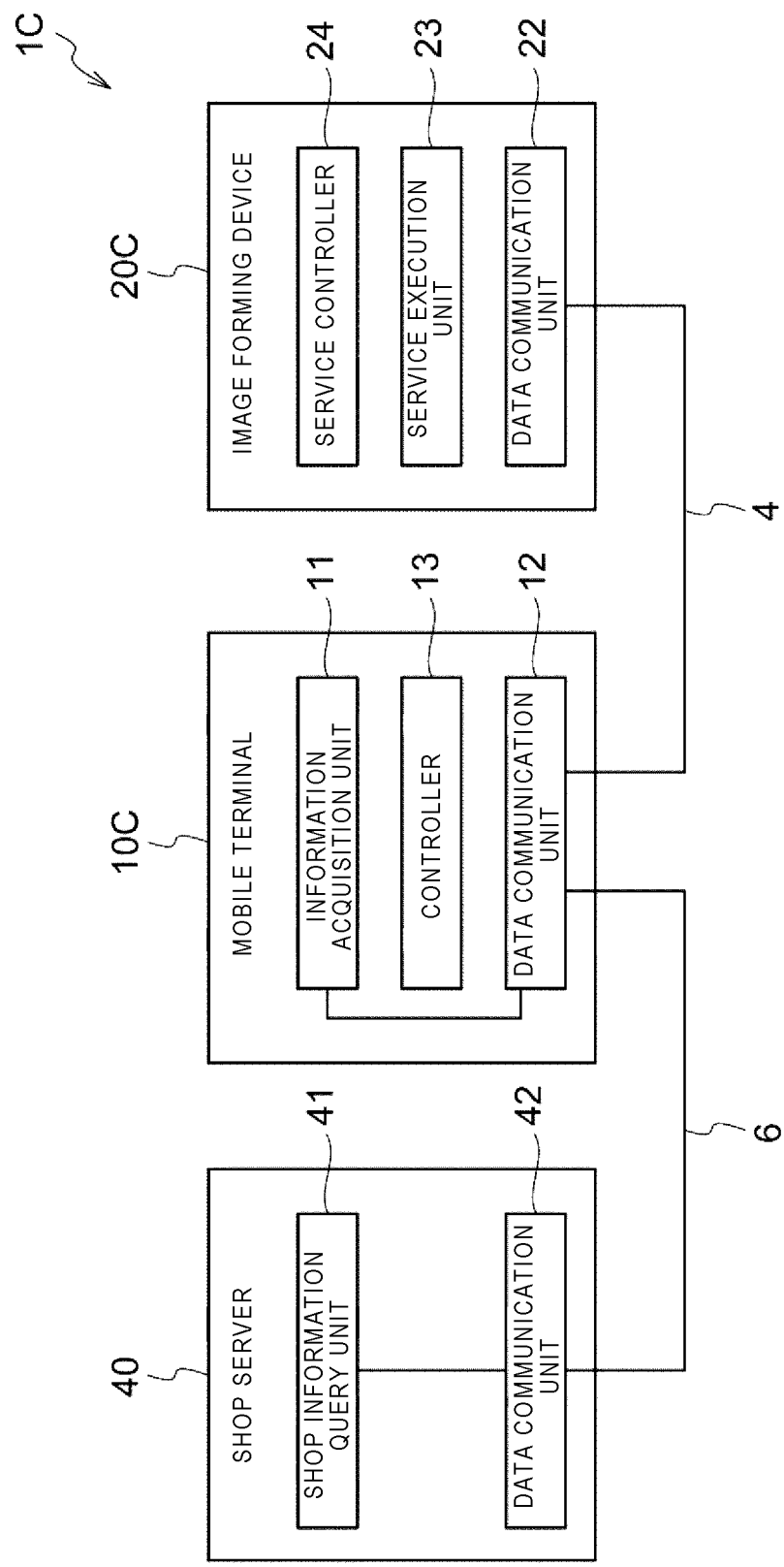
FIG. 9 shows a configuration example of an information processing system according to a third exemplary embodiment.

FIG. 9 shows a configuration example of the information processing system 1C according to the third exemplary embodiment. The information processing system 1C includes a mobile terminal 10C, an image forming device 20C, and a shop server 40.

The shop server 40 is a server that centrally manages shop information on each of shops. The model information on the image forming device 20C installed in the shop is also included in the shop information.

The shop server 40 is connected to, for example, an external communication line 6 that is different from the wireless line 4 connected to an apparatus (such as the image forming device 20C) installed in the shop. The external communication line 6 (for example, the Internet) is also capable of data communication with an apparatus installed outside the shop. The shop server 40 connected to the external communication line 6 is an example of the external device.

The shop server 40 includes a shop information query unit 41 and a data communication unit 42. The shop server 40 is installed, for example, in a place different from the shop that a user has entered.

The shop information query unit 41 queries a shop information table 44 for position information of the mobile terminal 10C received from the mobile terminal 10C, and acquires shop information on the shop in which the mobile terminal 10C is located. The shop information table 44 will be described later.

The data communication unit 42 transmits the shop information acquired by the shop information query unit 41 to the mobile terminal 10C via the external communication line 6. Further, the data communication unit 42 passes the position information of the mobile terminal 10C, which is received from the mobile terminal 10C via the external communication line 6, to the shop information query unit 41.

A configuration of the mobile terminal 10C is the same as that of the mobile terminal 10B according to the second exemplary embodiment shown in FIG. 7. It is noted that the controller 13 of the mobile terminal 10C notifies the data communication unit 12 of the position information of the mobile terminal 10C, and controls the data communication unit 12 of the mobile terminal 10C to connect to the external communication line 6 via a mobile carrier line and transmit the notified position information to the shop server 40.

As in the mobile terminal 10A according to the first exemplary embodiment, the mobile terminal 10C is implemented by the computer 30 shown in FIG. 2.

Further, the image forming device 20C is different from the image forming device 20B according to the second exemplary embodiment shown in FIG. 7 in that the information transmission unit 21 is omitted. The other configurations and functions are the same as those of the image forming device 20B. That is, the image forming device 20C does not transmit its own model information to the mobile terminal 10C, but prints data of a photograph received from the mobile terminal 10C via the wireless line 4 on a recording medium in accordance with a print setting designated by the application of the mobile terminal 10C.

Figure 10:
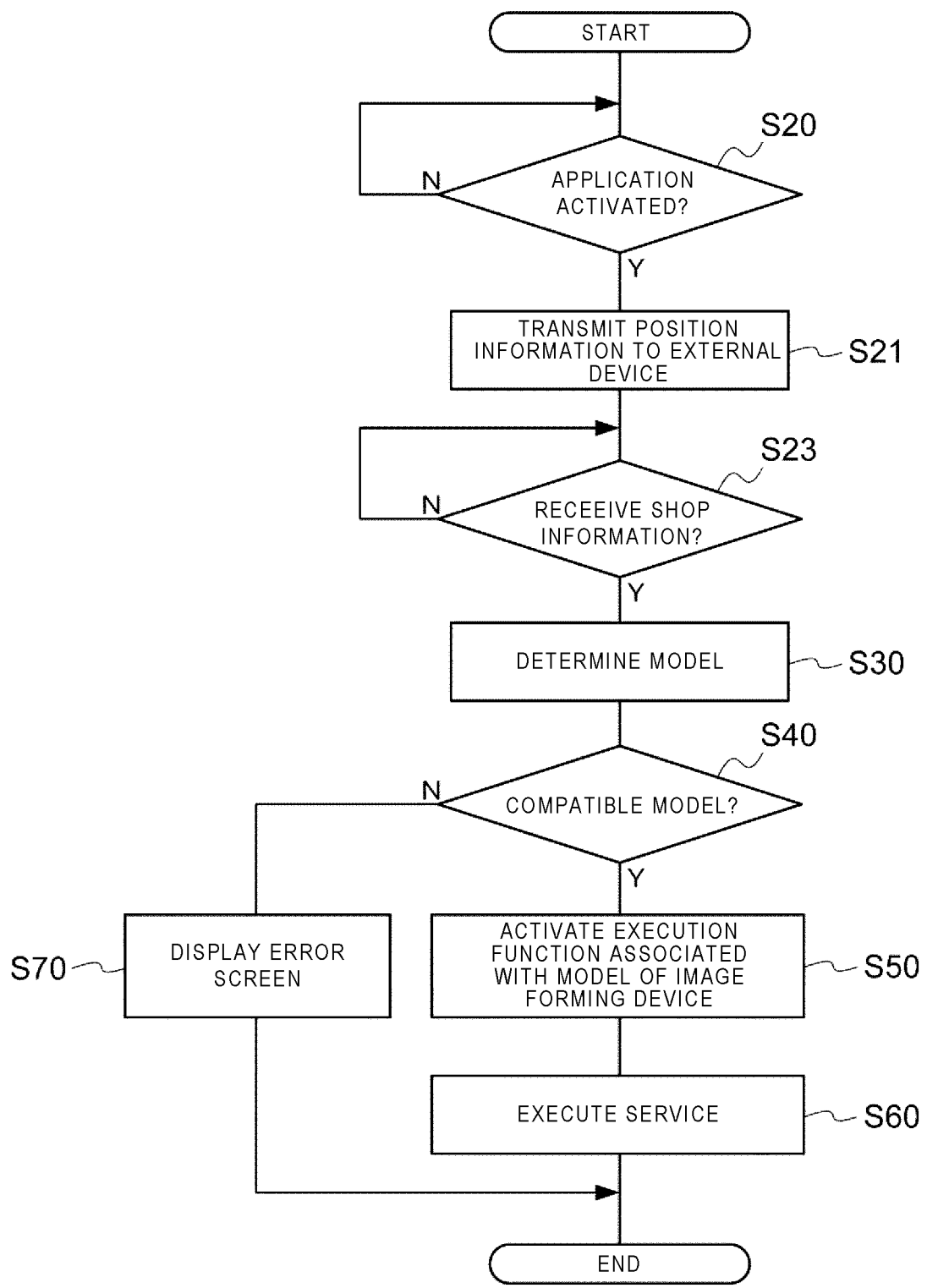
FIG. 10 is a flowchart of an example of a service process in a mobile terminal according to the third exemplary embodiment.

FIG. 10 is a flowchart of an example of a service process executed by the CPU 31 of the mobile terminal 10C.

An information processing program that defines the service process is stored in advance in, for example, the ROM 32 of the mobile terminal 10C. The CPU 31 of the mobile terminal 10C reads the information processing program stored in the ROM 32 and executes the service process.

The service process shown in FIG. 10 is different from the service process according to the second exemplary embodiment shown in FIG. 8 in that step S22 in FIG. 8 is replaced with step S21 and step S23. The other steps are the same as those in the service process according to the second exemplary embodiment shown in FIG. 8.

When the application is activated in the mobile terminal 10C by the user, step S21 of FIG. 10 is executed.

In step S21, the CPU 31 acquires position information indicating a position of the mobile terminal 10C from the position acquisition unit 39. The position information includes a latitude and a longitude of the position where the mobile terminal 10C is located. The CPU 31 transmits the acquired position information to the shop server 40 via the external communication line 6.

The shop server 40 that has received the position information queries the shop information table 44 and acquires the shop information on the shop where the mobile terminal 10C which has transmitted the position information is located.

FIG. 11 shows an example of the shop information table 44. The shop information table 44 includes the shop information in which the position information, a shop number, and the model information are associated with each other for each shop.

In the position information of the shop information table 44, the latitude and the longitude of the place where the shop is located are set. Therefore, the shop server 40 acquires, from among the shop information registered in the shop information table 44, shop information including position information within a predetermined range from the position information received from the mobile terminal 10C. That is, the acquired shop information can be regarded as the shop information on the shop that the user who owns the mobile terminal 10C has entered.

The shop information includes, in addition to the position information of the shop, the shop number for identifying the shop and the model information on the image forming device 20C installed in the shop represented by the shop number. The shop server 40 transmits the shop information acquired from the shop information table 44 to the mobile terminal 10C, which is a transmission source of the position information, via the external communication line 6.

In response to this, the CPU 31 determines whether the shop information has received from the shop server 40 in step S23 of FIG. 10. When the shop information has not been received, the CPU 31 repeatedly executes the determination process of step S23 to monitor a reception status of the shop information. On the other hand, when the shop information has been received, the process proceeds to step S30, and the CPU 31 determines the model of the image forming device 20C based on the model information included in the received shop information.

Thereafter, the CPU 31 executes the same processes as the process of step S40 and subsequent steps of the mobile terminal 10A according to the first exemplary embodiment shown in FIG. 3, and activates an execution function associated with the model of the image forming device 20C.

The CPU 31 may determine whether the activated application is an application for the user to use a service of the image forming device 20C based on the model information on the image forming device 20C included in the shop information, and may display the error screen 15 on the UI unit 38 of the mobile terminal 10C when another application that is not related to the service provided by the image forming device 20C is activated. In this case, when the application for using the service of the image forming device 20C is not installed in the mobile terminal 10C, the CPU 31 may display the download screen (not shown) on the UI unit 38 to prompt the user to download the application.

In this way, the mobile terminal 10C acquires the model information on the image forming device 20C from the external device installed outside the shop, so that the mobile terminal 10C can activate the execution function associated with the model of the image forming device 20C.

Fourth Exemplary Embodiment

A fourth exemplary embodiment descries an information processing system 1D that receives model information on the image forming device 20 from an external device installed in the same shop as a shop in which the image forming device 20 is installed.

Figure 12:
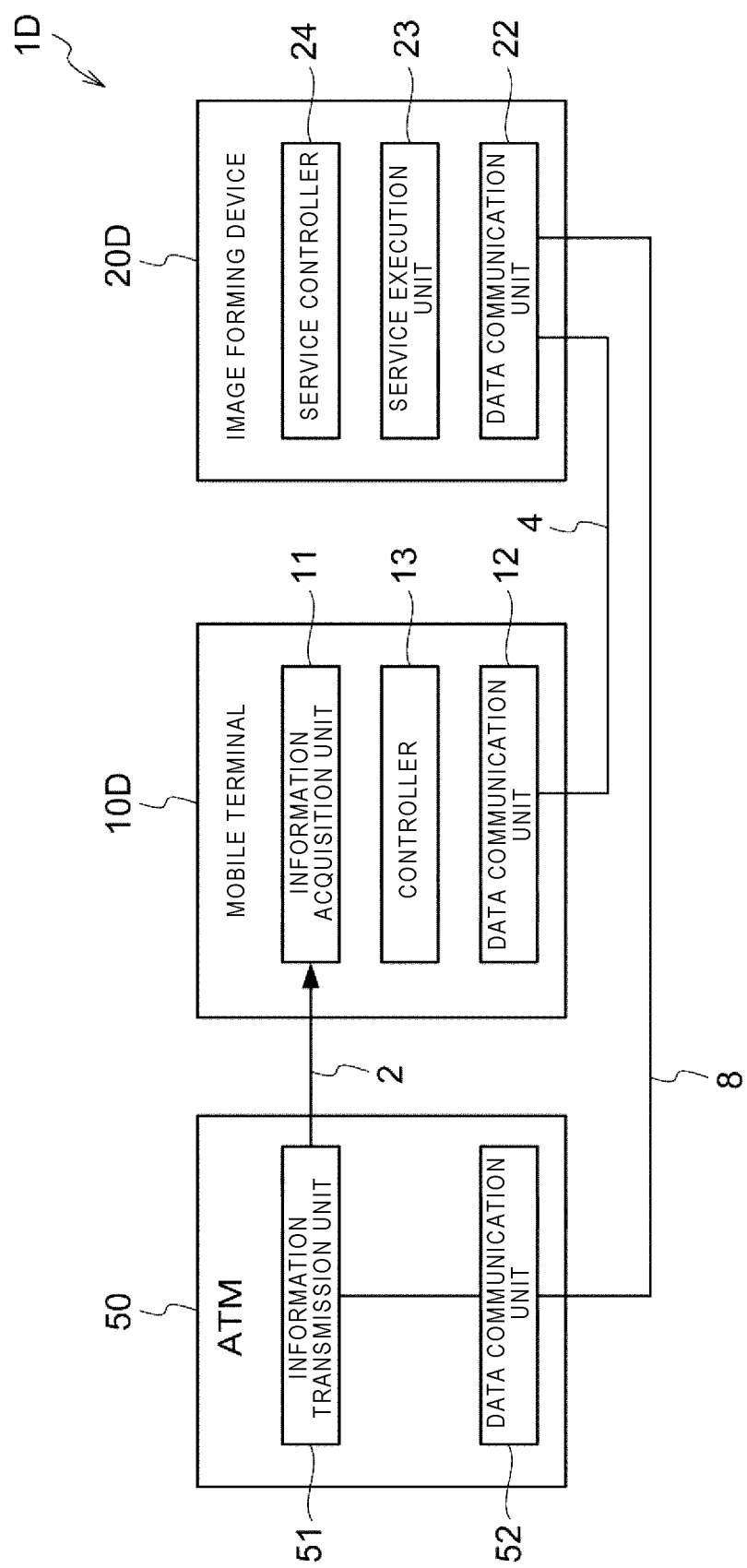
FIG. 12 shows a configuration example of an information processing system according to a fourth exemplary embodiment.

FIG. 12 shows a configuration example of the information processing system 1D according to the fourth exemplary embodiment. The information processing system 1D includes a mobile terminal 10D, an image forming device 20D, and an ATM 50 that is an example of the external device.

For example, any device (for example, a cash register installed in the shop) other than the image forming device 20 may be used as the external device. Here, an example in which the ATM 50 is used as the external device will be described.

The ATM 50 is a device that performs deposit, withdrawal, transfer, and the like of cash. The ATM 50 includes an information transmission unit 51 and a data communication unit 52.

The data communication unit 52 of the ATM 50 is connected to an in-shop communication line 8 that connects various devices installed in the shop. The data communication unit 52 receives the model information on the image forming device 20D from the image forming device 20D that is also connected to the in-shop communication line 8.

When the information transmission unit 51 of the ATM 50 receives the model information on the image forming device 20D from the data communication unit 52, the information transmission unit 51 constantly transmits the model information on the image forming device 20D through the wireless line 2. As in the information transmission unit 21 of the image forming device 20A according to the first exemplary embodiment shown in FIG. 1, the information transmission unit 51 of the ATM 50 constantly transmits the model information on the image forming device 20D using, for example, a beacon.

The mobile terminal 10D has the same configuration as the mobile terminal 10A according to the first exemplary embodiment shown in FIG. 1 except that a transmission source of the model information on the image forming device 20D acquired by the information acquisition unit 11 through the wireless line 2 is changed from the image forming device 20A according to the first exemplary embodiment shown in FIG. 1 to the ATM 50. As in the mobile terminal 10A according to the first exemplary embodiment, the mobile terminal 10D is implemented by the computer 30 shown in FIG. 2.

Further, the image forming device 20D has the same configuration as that of the image forming device 20A shown in FIG. 1 except that the information transmission unit 21 is removed from the image forming device 20A according to the first exemplary embodiment shown in FIG. 1. The image forming device 20D is connected to the mobile terminal 10D and the ATM 50 via the wireless line 4 and the in-shop communication line 8, respectively.

When viewed from the mobile terminal 10D, even if a transmission source of the model information on the image forming device 20D is different from that in the first exemplary embodiment, a process to be executed is the same as that in the first exemplary embodiment. Therefore, the mobile terminal 10D may only have to perform the same service process as the service process of the mobile terminal 10A according to the first exemplary embodiment shown in FIG. 3.

The mobile terminal 10D executes the service process according to the first exemplary embodiment shown in FIG. 3. Even when the image forming device 20D does not transmit its own model information, the mobile terminal 10D acquires the model information on the image forming device 20D from the ATM 50, and thus can activate an execution function associated with a model of the image forming device 20D in the mobile terminal 10D.

Here, the configuration example in which the ATM 50 is connected to the image forming device 20D through the in-shop communication line 8 has been described. Alternatively, the external device in the shop (such as the ATM 50) does not necessarily need to be connected to the image forming device 20D through the in-shop communication line 8. In this case, when the model information on the image forming device 20D is set in advance in the external device in the shop, the model information on the image forming device 20D can be notified from the external device via the wireless line 2.

Fifth Exemplary Embodiment

A shop in which the image forming device 20 is installed may provide a public wireless LAN service that enables the mobile terminal 10 of a user registered in advance to connect to a public wireless LAN 7 connected to the external communication line 6 in a limited region such as the shop.

A fifth exemplary embodiment describes an information processing system 1E that receives model information on the image forming device 20 using the public wireless LAN service.

Figure 13:
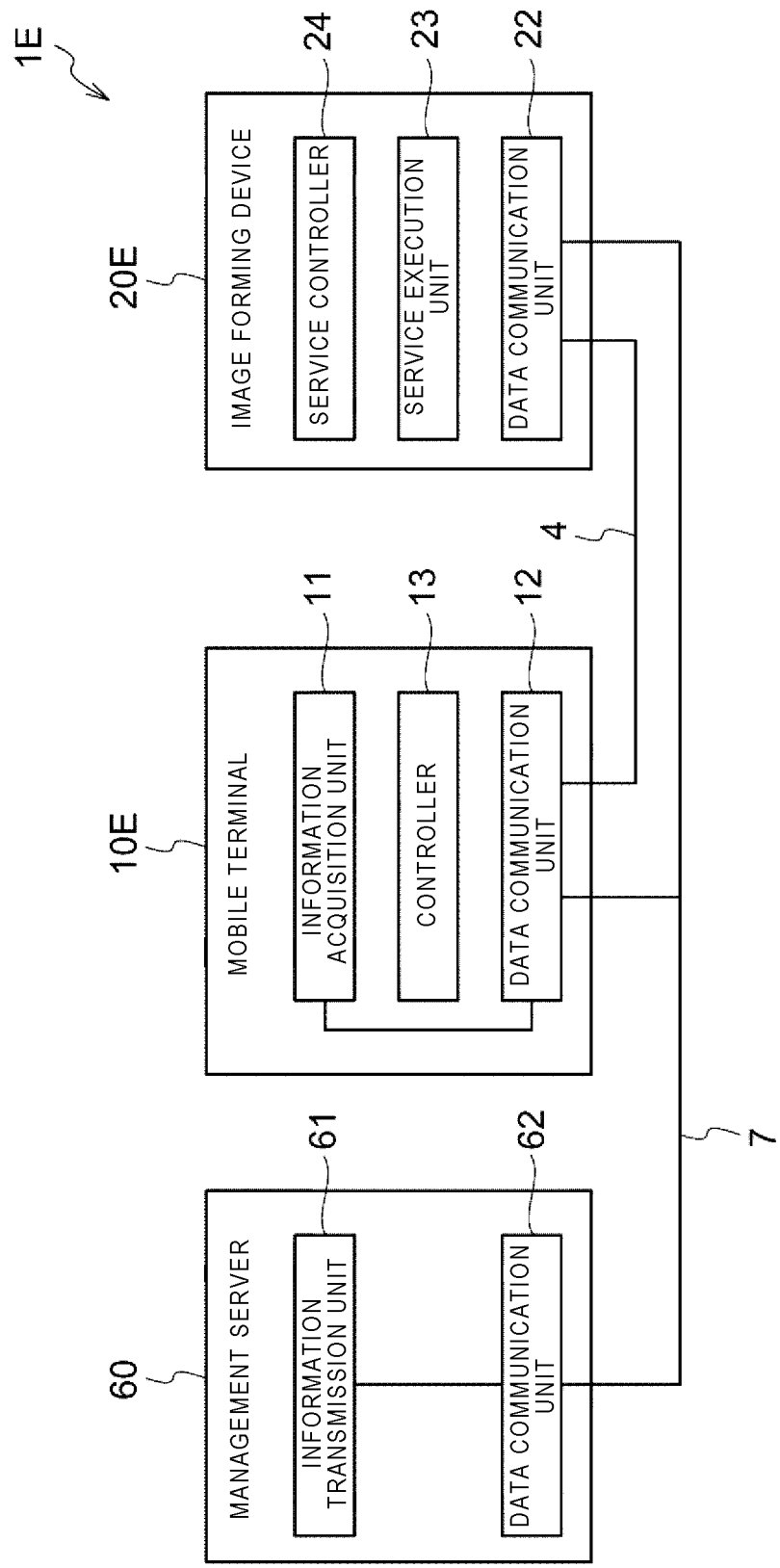
FIG. 13 shows a configuration example of an information processing system according to a fifth exemplary embodiment.

FIG. 13 shows a configuration example of the information processing system 1E according to the fifth exemplary embodiment. The information processing system 1E includes a mobile terminal 10E, an image forming device 20E, and a management server 60.

The management server 60 is a device that manages various information in the public wireless LAN service. The management server 60 is installed in each shop. The management server 60 includes an information transmission unit 61 and a data communication unit 62. The management server 60 is connected to the public wireless LAN 7 by the data communication unit 62.

When the mobile terminal 10E is connected to an access point of the shop using the public wireless LAN 7, the information transmission unit 61 of the management server 60 transmits, via the public wireless LAN 7 and the data communication unit 62, model information on the image forming device 20E installed in the shop to the mobile terminal 10E connected to the access point. The public wireless LAN service may be a free service or a paid service.

A configuration of the mobile terminal 10E is the same as the configuration of the mobile terminal 10D according to the fourth exemplary embodiment shown in FIG. 12. It is noted that the information acquisition unit 11 of the mobile terminal 10D shown in FIG. 12 acquires the model information on the image forming device 20D via the wireless line 2, whereas the information acquisition unit 11 of the mobile terminal 10E according to the fifth exemplary embodiment acquires the model information on the image forming device 20E via the public wireless LAN 7 and the data communication unit 12.

As in the mobile terminal 10A according to the first exemplary embodiment, the mobile terminal 10E is implemented by the computer 30 shown in FIG. 2.

The configuration of the image forming device 20E is also the same as the configuration of the image forming device 20D according to the fourth exemplary embodiment shown in FIG. 12, except that the data communication unit 22 of the image forming device 20D is connected to the in-shop communication line 8 while the data communication unit 22 of the image forming device 20E is connected to the public wireless LAN 7.

Figure 14:
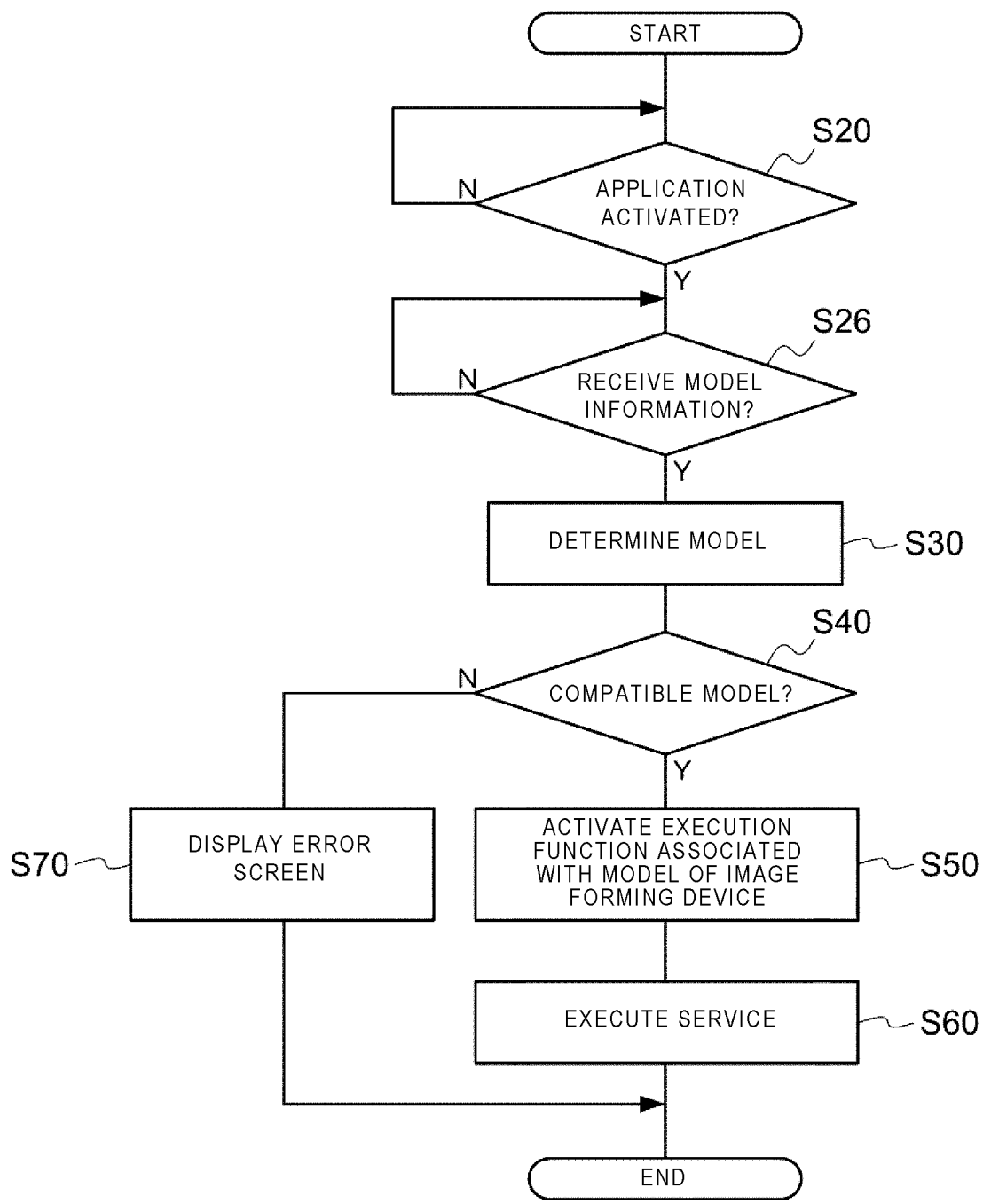
FIG. 14 is a flowchart of an example of a service process in a mobile terminal according to the fifth exemplary embodiment.

FIG. 14 is a flowchart of an example of a service process executed by the CPU 31 of the mobile terminal 10E.

An information processing program that defines the service process is stored in advance in, for example, the ROM 32 of the mobile terminal 10E. The CPU 31 of the mobile terminal 10E reads the information processing program stored in the ROM 32 and executes the service process.

Prior to the execution of the service process shown in FIG. 14, the mobile terminal 10E is connected to the public wireless LAN 7.

The service process shown in FIG. 14 is a process in which step S22 of the service process according to the second exemplary embodiment shown in FIG. 8 is replaced with step S26.

That is, when an application is activated in the mobile terminal 10E by the user, step S26 of FIG. 14 is executed.

In step S26, the CPU 31 determines whether the model information has been received from the public wireless LAN 7. When the model information has not been received, the determination process of step S26 is repeatedly executed to monitor a reception status of the model information. On the other hand, when the model information has been received, the process proceeds to step S30, and the CPU 31 determines a model of the image forming device 20E based on the received model information.

Thereafter, the CPU 31 executes the same processes as the process of step S40 and subsequent steps of the mobile terminal 10A according to the first exemplary embodiment shown in FIG. 3, and activates an execution function associated with the model of the image forming device 20E.

In this way, the mobile terminal 10E connects to the public wireless LAN 7 provided by the shop, so that the mobile terminal 10E can activate the execution function associated with the model of the image forming device 20E in the mobile terminal 10E.

The fifth exemplary embodiment describes a configuration in which the management server 60 is installed in each shop. Alternatively, one management server 60 may be installed for plural shops.

When the mobile terminal 10E is connected to the public wireless LAN 7, identification information (which will be referred to as a "spot ID") of the access point to which the mobile terminal 10E is connected is transmitted from the access point to the management server 60. Since the access point is installed in each shop, the management server 60 acquires shop information on the shop in which the mobile terminal 10E connecting to the access point is located, using the spot ID transmitted from each access point and a shop information table 44A.

FIG. 15 shows an example of the shop information table 44A referred to by the management server 60. The shop information table 44A includes the shop information in which the spot ID, a shop number, and the model information are associated with each other for each shop. That is, the shop information table 44A is a table in which position information of the shop information table 44 according to the third exemplary embodiment shown in FIG. 11 is replaced with the spot ID.

The management server 60 acquires shop information including the same spot ID as the spot ID transmitted from the access point from among the shop information registered in the shop information table 44A. That is, the acquired shop information can be regarded as the shop information on the shop that the user who owns the mobile terminal 10E has entered.

When the management server 60 transmits the shop information acquired from the shop information table 44A to the access point which is a transmission source of the spot ID, the mobile terminal 10E can obtain the shop information through the public wireless LAN 7, and thus can determine the model of the image forming device 20E.

The first exemplary embodiment to the fifth exemplary embodiment have described the examples in which one of the image forming devices 20A to 20E (which are simply referred to as the "image forming device 20") is installed in each shop. However, depending on the shop, plural image forming devices 20 having different model information may be installed.

In this case, in step S30 in each of FIGS. 3, 8, 10, and 14, the CPU 31 may prompt the user to select an image forming device 20 for using a service from among the plural image forming devices 20 having the different model numbers and versions corresponding to the received plural pieces of model information, and determine whether the model of the image forming device 20 is compatible with the application based on the model of the image forming device 20 selected by the user.

Further, in order to reduce the number of times the user directly touches the image forming device 20 to operate the image forming device 20, the user may make a setting of the service to be used through the application in advance and then operate the image forming device 20. In this case, the CPU 31 may prompt the user to set simply a setting item that is common to models but does not depend on the model of the image forming device 20, and after the model of the image forming device 20 used by the user is determined, the CPU 31 may further prompt the user to set information on a setting item unique to the image forming device 20 used by the user.

As described above, an aspect of the information processing system has been described using the exemplary embodiments. The disclosed aspect of the information processing system is a mere example. The aspect of the information processing system is not limited to the scope described in the exemplary embodiments. Various modifications or improvements may be made to the exemplary embodiments without departing from the gist of the present disclosure, and the exemplary embodiments to which the modifications or the improvements are added are also included in the technical scope of the present disclosure. For example, an order of the service process shown in FIGS. 3, 8, 10, and 14 may be changed without departing from the gist of the present disclosure.

Further, in the exemplary embodiments described above, the service process is implemented by software. However, the same processes as those in the flowcharts shown in FIGS. 3, 8, 10, and 14 may be performed by hardware. In this case, a processing speed is increased as compared to the case where the service process is implemented by the software.

In the embodiments above, the term "processor" refers to hardware in a broad sense (for example, the CPU 31). Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The exemplary embodiments described above described an example in which the information processing program is stored in the ROM 32, whereas a storage destination of the information processing program is not limited to the ROM 32. The information processing program according to the present disclosure may be provided in a form of being recorded on a storage medium that can be read by the computer 30. For example, the information processing program may be provided in a form of being recorded on an optical disc such as a compact disc read only memory (CD-ROM) and a digital versatile disc read only memory (DVD-ROM). Further, the information processing program may be provided in a form of being recorded in a portable semiconductor memory such as a universal serial bus (USB) memory and a memory card. The ROM 32, the nonvolatile memory 34, the CD-ROM, the DVD-ROM, the USB, and the memory card are examples of a non-transitory storage medium.

Further, the mobile terminal 10 may download the information processing program from the external device connected to the external communication line 6 or the public wireless LAN 7, and store the downloaded information processing program in the storage device. In this case, the CPU 31 of the mobile terminal 10E reads the information processing program downloaded from the external device and executes the service process.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A non-transitory computer readable medium storing a program that causes a computer to execute information processing, the information processing comprising:
receiving, through a wireless line from a service apparatus configured to provide a service in cooperation with a mobile terminal including the non-transitory computer readable medium, model information indicating a model of the service apparatus; and
upon determining (i) that an application used to execute the service is already activated on the mobile terminal, and (ii) that the mobile terminal has an execution function associated with the model of the service apparatus indicated by the model information from among a plurality of execution functions included in the mobile terminal, the plurality of execution functions being execution functions of executing services each associated in advance with a respective one of models of service apparatuses, displaying, without a user input, a user interface on the mobile terminal for receiving a user instruction to connect to the service apparatus to execute the service.

2. The non-transitory computer readable medium according to claim 1, wherein
the plurality of execution functions are implemented by individual applications, respectively, and
the information processing further comprises:
executing a process of selecting and activating an application that implements the execution function associated with the model of the service apparatus indicated by the model information from among a plurality of applications each associated in advance with a respective one of the models of the service apparatuses.

3. The non-transitory computer readable medium according to claim 1, wherein
the plurality of execution functions are implemented by individual modules included in a same application, respectively, and
the information processing further comprises:
execute a process of selecting and activating a module that implements the execution function associated with the model of the service apparatus indicated by the model information from among a plurality of modules each associated in advance with a respective one of the models of the service apparatuses.

4. The non-transitory computer readable medium according to claim 1, wherein
the information processing further comprises:
when the execution function associated with the model of the service apparatus indicated by the model information is not included in the mobile terminal, executing a process of displaying, on the mobile terminal, an error screen notifying that the service provided by the service apparatus is unavailable.

5. The non-transitory computer readable medium according to claim 2, wherein
the information processing further comprises:
when the execution function associated with the model of the service apparatus indicated by the model information is not included in the mobile terminal, executing a process of displaying, on the mobile terminal, an error screen notifying that the service provided by the service apparatus is unavailable.

6. The non-transitory computer readable medium according to claim 3, wherein
the information processing further comprises:
when the execution function associated with the model of the service apparatus indicated by the model information is not included in the mobile terminal, executing a process of displaying, on the mobile terminal, an error screen notifying that the service provided by the service apparatus is unavailable.

7. The non-transitory computer readable medium according to claim 4, wherein
the information processing further comprises:
executing a process of displaying, on the mobile terminal, a download screen that prompts a user to download a program that implements the execution function associated with the model of the service apparatus indicated by the model information.

8. The non-transitory computer readable medium according to claim 5, wherein
the information processing further comprises:
executing a process of displaying, on the mobile terminal, a download screen that prompts a user to download a program that implements the execution function associated with the model of the service apparatus indicated by the model information.

9. The non-transitory computer readable medium according to claim 6, wherein
the information processing further comprises:
executing a process of displaying, on the mobile terminal, a download screen that prompts a user to download a program that implements the execution function associated with the model of the service apparatus indicated by the model information.

10. The non-transitory computer readable medium according to claim 1, wherein
the information processing further comprises:
executing a process of receiving the model information transmitted from an external device associated with the service apparatus.

11. The non-transitory computer readable medium according to claim 2, wherein
the information processing further comprises:
executing a process of receiving the model information transmitted from an external device associated with the service apparatus.

12. The non-transitory computer readable medium according to claim 3, wherein
the information processing further comprises:
executing a process of receiving the model information transmitted from an external device associated with the service apparatus.

13. The non-transitory computer readable medium according to claim 4, wherein
the information processing further comprises:

executing a process of receiving the model information transmitted from an external device associated with the service apparatus.

14. The non-transitory computer readable medium according to claim 5, wherein
the information processing further comprises:
executing a process of receiving the model information transmitted from an external device associated with the service apparatus.

15. The non-transitory computer readable medium according to claim 6, wherein
the information processing further comprises:
executing a process of receiving the model information transmitted from an external device associated with the service apparatus.

16. The non-transitory computer readable medium according to claim 7, wherein
the information processing further comprises:
executing a process of receiving the model information transmitted from an external device associated with the service apparatus.

17. The non-transitory computer readable medium according to claim 8, wherein
the information processing further comprises:
executing a process of receiving the model information transmitted from an external device associated with the service apparatus.

18. The non-transitory computer readable medium according to claim 9, wherein
the information processing further comprises:
executing a process of receiving the model information transmitted from an external device associated with the service apparatus.

19. The non-transitory computer readable medium according to claim 10, wherein
the information processing further comprises:
executing a process of transmitting position information of the mobile terminal to the external device, and receiving the model information on the service apparatus installed in a shop indicated by the position information of the mobile terminal from the external device.

20. An information processing system comprising:
service apparatuses, each of the service apparatuses being configured to provide a service that is determined in advance for a model of the service apparatus, in cooperation with a mobile terminal; and
the mobile terminal comprising a computer, wherein
the computer is configured to
receive, through a wireless line from a service apparatus configured to provide a service in cooperation with the mobile terminal, model information indicating a model of the service apparatus, and
upon determining (i) that an application used to execute the service is already activated on the mobile terminal, and (ii) that the mobile terminal has an execution function associated with the model of the service apparatus indicated by the received model information from among a plurality of execution functions installed in advance, the plurality of execution functions providing interfaces with the services provided by the service apparatuses, display, without a user input, a user interface on the mobile terminal for receiving a user instruction to connect to the service apparatus to execute the service.

* * * * *